United States Patent
Nezaki

(10) Patent No.: US 8,066,303 B2
(45) Date of Patent: Nov. 29, 2011

(54) VEHICLE OCCUPANT RESTRAINT SYSTEM

(75) Inventor: Takuya Nezaki, Mizunami (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/639,159

(22) Filed: Dec. 16, 2009

(65) Prior Publication Data

US 2010/0156084 A1    Jun. 24, 2010

(30) Foreign Application Priority Data

Dec. 18, 2008   (JP) .................................. 2008-322080

(51) Int. Cl.
*B60R 22/36* (2006.01)

(52) U.S. Cl. ....................................................... 280/806

(58) Field of Classification Search ............... 280/801.1, 280/806, 807, 808; 297/468, 474, 475, 484, 297/486
See application file for complete search history.

(56) References Cited

U.S. PATENT DOCUMENTS

| | | | |
|---|---|---|---|
| 6,863,298 B2 | 3/2005 | Sakai et al. | |
| 7,011,341 B2 * | 3/2006 | Herberg et al. | 280/807 |
| 7,201,399 B2 * | 4/2007 | Frank et al. | 280/801.1 |
| 2004/0251675 A1 * | 12/2004 | Herberg et al. | 280/806 |

FOREIGN PATENT DOCUMENTS

| | | |
|---|---|---|
| JP | 03237520 A | 8/2003 |
| JP | 2004017686 A | 1/2004 |
| JP | 2004330975 A | 11/2004 |
| JP | 2004330977 A | 11/2004 |
| JP | 2007160986 A | 6/2007 |

* cited by examiner

*Primary Examiner* — Faye M. Fleming
(74) *Attorney, Agent, or Firm* — Gifford, Krass, Sprinkle, Anderson & Citkowski, P.C.

(57) ABSTRACT

A vehicle occupant restraint system includes: a lap belt that restrains a hip of a seated occupant; a shoulder belt that has a lower end portion coupled to a middle portion of the lap belt in a seat width direction and that is used to restrain an upper body of the seated occupant; a lap belt tensioner that applies tension to the lap belt; and a shoulder belt tensioner that applies tension to the shoulder belt. When a vehicle collision is predicted or detected, the lap belt tensioner is activated before the shoulder belt tensioner is activated.

5 Claims, 6 Drawing Sheets

VEHICLE OCCUPANT RESTRAINT SYSTEM

INCORPORATION BY REFERENCE

The disclosure of Japanese Patent Application No. 2008-322080 filed on Dec. 18, 2008 including the specification, drawings and abstract is incorporated herein by reference in its entirety.

BACKGROUND OF THE INVENTION

1. Field of the Invention

The invention relates to a vehicle occupant restraint system that restrains an occupant, seated in a seat, to the seat at least in the event of a collision.

2. Description of the Related Art

There is known a seat belt that includes a pair of left and right lap belt retractors that retract left and right lap belts and a pair of left and right shoulder belt retractors that retract left and right shoulder belts, in which the retracting forces of the lap belt retractors are set to be larger than the retracting forces of the shoulder belt retractors (for example, see Japanese Patent Application Publication No. 2004-330975 (JP-A-2004-330975)). According to the JP-A-2004-330975, this configuration prevents the lap belts from being raised by the retracting forces of the shoulder belts.

However, in the above described existing technique, when the belts are forcibly retracted in the event of a vehicle collision, the lap belt retractors retract the lap belts against the retracting forces of the shoulder belt retractors. Therefore, in order to ensure readiness, the lap belt retractors each need to have a large driving source that is able to generate a large driving force.

In addition, not only when the belts are retracted by the retractors but also when a gas generator of a pretensioner provided at each anchor support portion that fixes the lap belt is activated to draw the lap belt or when an airbag provided for each lap belt is inflated to apply tension to the lap belt, the tension should be applied to each lap belt against the tension applied to each shoulder belt. Therefore, in any cases, it is necessary to generate a large gas pressure.

SUMMARY OF THE INVENTION

The invention provides a vehicle occupant restraint system that is able to desirably restrain an occupant when a vehicle collision is predicted or detected.

A first aspect of the invention provides a vehicle occupant restraint system. The vehicle occupant restraint system includes: a lap belt that restrains a hip of a seated occupant; a shoulder belt that has a lower end portion coupled to a middle portion of the lap belt in a seat width direction and that is used to restrain an upper body of the seated occupant; a lap belt tensioner that applies tension to the lap belt; and a shoulder belt tensioner that applies tension to the shoulder belt. When a vehicle collision is predicted or detected, the lap belt tensioner is activated before the shoulder belt tensioner is activated.

With the vehicle occupant restraint system according to the first aspect, the lap belt is worn on the hip of the seated occupant while the shoulder belt is worn on the upper body of the seated occupant. Thus, it is possible to restrain the hip and upper body of the occupant to the vehicle seat. When a vehicle collision is predicted or detected, first, the lap belt tensioner is activated to apply tension to the lap belt and, after that, (where appropriate) the shoulder belt tensioner is activated to apply tension to the shoulder belt.

Thus, in the vehicle occupant restraint system, at least in the initial stage in which the lap belt tensioner applies tension to the lap belt, force for applying tension to the shoulder belt (reaction force resulting from the tension of the shoulder belt) does not act on the lap belt. Thus, the lap belt tensioner is able to tension the lap belt for a short period of time, so readiness is ensured. The tension applied to the lap belt beforehand suppresses deformation of a coupled portion, at which the lap belt is coupled to the shoulder belt, due to the tension of the shoulder belt. Thus, a proper occupant restraint (position) shape is maintained.

In this way, with the vehicle occupant restraint system according to the first aspect, it is possible to desirably restrain the occupant when a vehicle collision is predicted or detected. In addition, this contributes to reduction in power and size of the lap belt tensioner.

In the vehicle occupant restraint system according to the first aspect, the lap belt tensioner may be a lap belt retractor that forcibly retracts the lap belt, and the shoulder belt tensioner may be a shoulder belt retractor that forcibly retracts the shoulder belt. The vehicle occupant restraint system according to the first aspect may further include a controller that, when a vehicle collision is predicted or detected, activates the lap belt retractor before activating the shoulder belt retractor.

In the above aspect, the controller, when a vehicle collision is predicted or detected, first causes the lap belt retractor to retract the lap belt to thereby tension the lap belt and, after that, causes the shoulder belt retractor to retract the shoulder belt to thereby tension the shoulder belt. Thus, in the above aspect, the controller controls the retractors to reliably apply tension to the lap belt prior to the shoulder belt when a vehicle collision is predicted or detected. Hence, it is possible to desirably restrain the occupant.

In addition, in the vehicle occupant restraint system according to the first aspect, the shoulder belt tensioner may be activated after the lap belt tensioner completes applying tension to the lap belt.

In this aspect, the lap belt tensioner is able to tension the lap belt without acting against the reaction force resulting from the tension of the shoulder belt. Thus, the lap belt is readily tensioned, and power for tensioning the lap belt may be small.

Alternatively, in the vehicle occupant restraint system according to the first aspect, the shoulder belt tensioner may be activated before the lap belt tensioner completes applying tension to the lap belt.

In this aspect, the shoulder belt tensioner is activated while the tension is applied to the lap belt by the lap belt tensioner. This shortens a period of time from when application of tension to the lap belt is started to when application of tension to the shoulder belt is completed. Note that when it is configured so that application of tension to the lap belt is completed while the tension is applied to the shoulder belt (particularly, when the shoulder belt is loose), the lap belt is readily tensioned, and power for tensioning the lap belt may be small.

In the vehicle occupant restraint system according to the first aspect, a pair of the shoulder belts may be provided so that the pair of the left and right shoulder belts arranged in parallel with each other in the seat width direction restrain the upper body of the occupant, the shoulder belt tensioner may be provided so as to apply tension to each of the pair of left and right shoulder belts, and the lap belt tensioner may be provided so as to apply tension to the lap belt from both ends of the lap belt in a longitudinal direction of the lap belt.

In this aspect, the lap belt tensioner applies tension to the lap belt from both sides of the lap belt in the longitudinal direction of the lap belt. This suppresses positional deviations of coupled portions, at which the lap belt is coupled to the left and right shoulder belts, in the longitudinal direction (lateral direction) of the lap belt when the tension is applied to the lap belt. Therefore, the lap belt and the shoulder belts ensure respective proper occupant restraint shapes.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
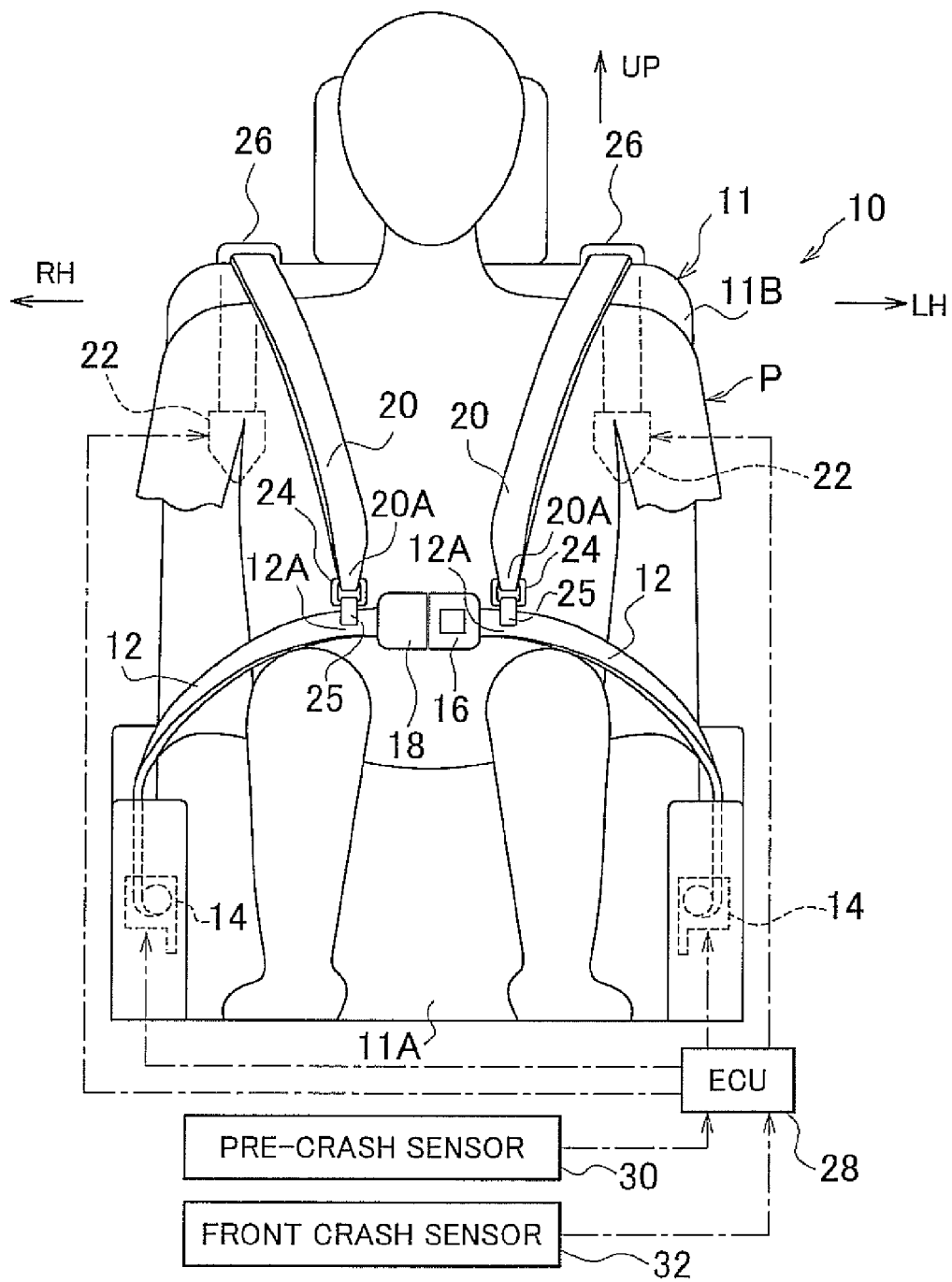
FIG. 1 is a front view that shows a four-point seat belt system according to a first embodiment of the invention.

A four-point seat belt system 10, which is a vehicle occupant restraint system according to a first embodiment of the invention, will be described with reference to FIG. 1 to FIG. 3. Note that the arrow FR, the arrow UP, the arrow LH and the arrow RH in the drawings respectively indicate the forward direction (traveling direction), upward direction, and left and right sides (vehicle width direction) when directed in the traveling direction of a vehicle equipped with the four-point seat belt system 10. These substantially correspond to the forward direction, upward direction and left and right sides of a seat width direction of a vehicle seat 11 to which the four-point seat belt system 10 is applied.

FIG. 1 shows a schematic front view of a state where the four-point seat belt system 10 applied to the vehicle seat 11 is used (worn by an occupant). In addition, FIG. 2 shows a side view of the usage state where the four-point seat belt system 10 is used. In the following description, when a description is made with reference to the upper, lower, left and right directions, and the like, this usage state is used as a reference.

Figure 2:
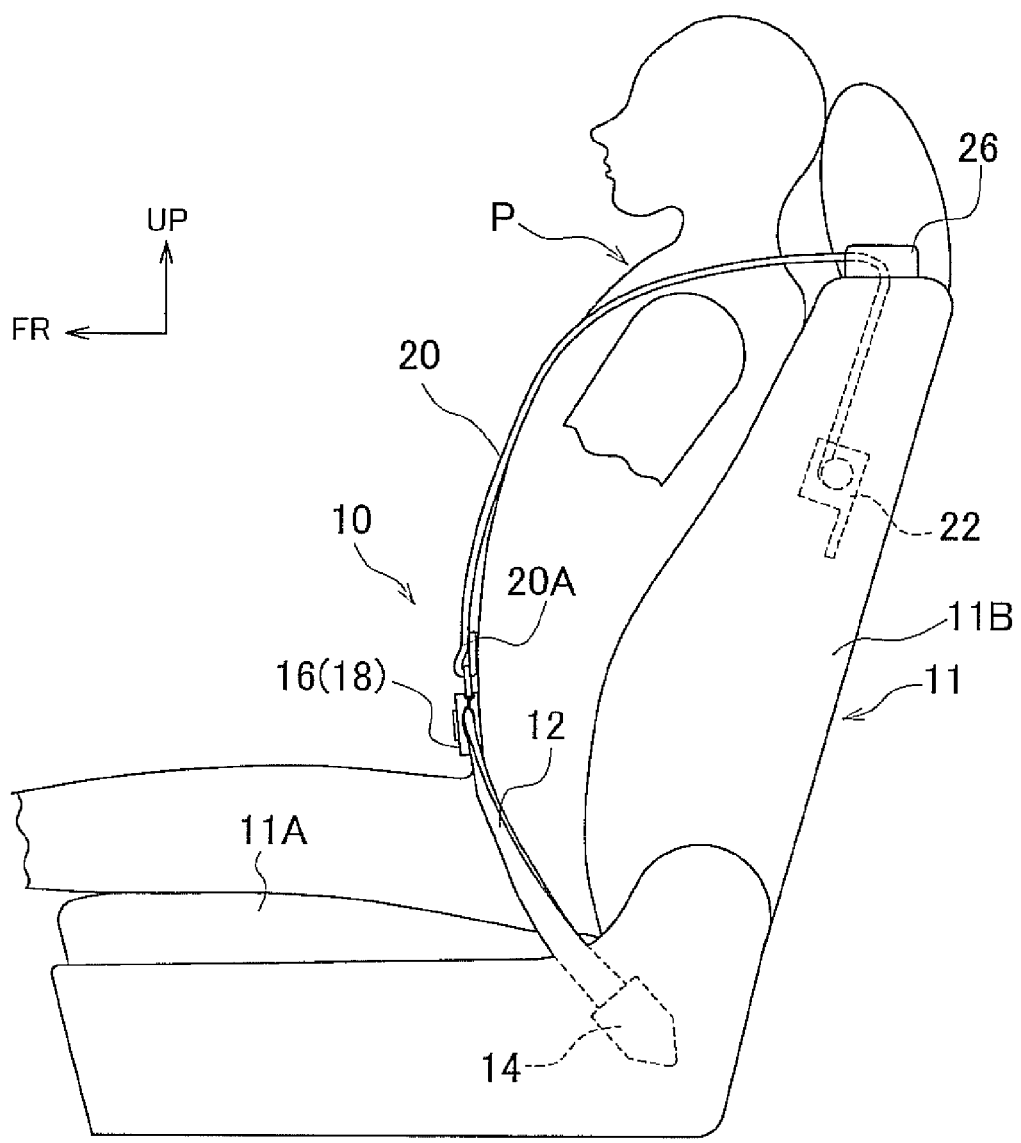
FIG. 2 is a side view that schematically shows the four-point seat belt system according to the first embodiment of the invention.

As shown in FIG. 1 and FIG. 2, the four-point seat belt system 10 includes a pair of left and right lap belts 12. The outer ends of the lap belts 12 in the seat width direction are retracted by lap belt retractors 14, which serve as a retracting device, so that the lap belts 12 can be pulled out. Each lap belt retractor 14 urges (applies tension to) a corresponding one of the lap belts 12 by a predetermined retracting force to suppress a slack of each lap belt 12 worn by the occupant. In the present embodiment, each lap belt retractor 14 is installed in a seat cushion 11A that constitutes the vehicle seat 11.

On the other hand, a buckle 16 and a tongue plate 18 are respectively provided at the inner ends of the lap belts 12 in the seat width direction. Specifically, the buckle 16, which is an engaged member, is provided at the inner end of the left lap belt 12 in the seat width direction, and the tongue plate 18, which is an engaging member engageable with the buckle 16, is provided at the inner end of the right lap belt 12 in the seat width direction. As the tongue plate 18 is fastened to the buckle 16, the left and right lap belts 12 are worn on the hip (restrain the hip) of an occupant P seated on the vehicle seat 11 as shown in FIG. 1.

In addition, the four-point seat belt system 10 includes a pair of left and right shoulder belts 20. The lower end portion of the left shoulder belt 20 is coupled to a portion of the left lap belt 12 close to the buckle 16 (coupled portion 12A). The lower end portion of the right shoulder belt 20 is coupled to a portion of the right lap belt 12 close to the tongue plate 18 (coupled portion 12A). The upper ends of the respective shoulder belts 20 are retracted by shoulder belt retractors 22 so that the shoulder belts 20 can be pulled out. In the present embodiment, a connecting portion at which the buckle 16 is connected to the left lap belt 12 is spaced at a predetermined distance away from a connecting portion at which the shoulder belt 20 is connected to the left lap belt 12. Similarly, a connecting portion at which the tongue plate 18 is connected to the right lap belt 12 is spaced at a predetermined distance away from a connecting portion at which the shoulder belt 20 is connected to the right lap belt 12.

The coupled structure of each shoulder belt 20 to the lap belt 12 will be additionally described. As shown in FIG. 1, the lower end portion 20A of the shoulder belt 20 is narrowed in the width direction toward the lower end and then the narrowed portion is folded back and sewed. By so doing, a coupling ring 24 is coupled to the shoulder belt 20 so as not to drop off. The coupling ring 24 is coupled to the lap belt 12 so as not to drop off in such a manner that a narrow webbing 25, of which one end is sewed to the lap belt 12, is folded back at the other end and is sewed. Thus, each shoulder belt 20 is coupled to a corresponding one of the lap belts 12 via the coupling ring 24 and the narrow webbing 25 so that the shoulder belt 20 is tiltable (variable in position) in the thickness direction and in the width direction.

Each shoulder belt retractor 22 urges (applies tension to) a corresponding one of the shoulder belts 20 by a predetermined retracting force to suppress a slack of the shoulder belt 20 worn by the occupant. In the present embodiment, each shoulder belt retractor 22 is installed in a seat back 11B that constitutes the vehicle seat 11. In addition, each shoulder belt 20 is inserted through a belt guide 26 provided at a shoulder portion of the seat back 11B.

Thus, the four-point seat belt system 10 is configured so that, as the buckle 16 and the tongue plate 18 are coupled by the occupant P seated on the vehicle seat 11, the left and right lap belts 12 arranged in series with each other are worn on the hip of the occupant P seated on the vehicle seat 11, and the pair of left and right shoulder belts 20 arranged in parallel with each other in the seat width direction are worn on the upper body of the seated occupant P as shown in FIG. 1.

Then, each of the lap belt retractors 14 that constitute the four-point seat belt system 10 is a motor retractor (PSB) that is able to retract the lap belt 12 by the power of a built-in motor (not shown), and includes a pretensioner mechanism that forcibly retracts the lap belt 12 by a predetermined amount by activating a built-in micro gas generator (MGG). That is, each lap belt retractor 14 includes two types of mechanisms for forcibly retracting the lap belt 12.

In addition, each of the shoulder belt retractors 22 that constitute the four-point seat belt system 10 is a motor retractor (PSB) that is able to retract the shoulder belt 20 by the power of a built-in motor (not shown), and includes a pretensioner mechanism that forcibly retracts the shoulder belt 20 by a predetermined amount by activating a built-in micro gas generator (MGG). That is, each shoulder belt retractor 22 includes two types of mechanisms for forcibly retracting the shoulder belt 20.

Activation of these lap belt retractors 14 and shoulder belt retractors 22 is controlled by an ECU 28, which serves as a controller. Specifically, a pre-crash sensor 30 and a front crash sensor 32 are electrically connected to the ECU 28. The pre-crash sensor 30 predicts a front collision of an automobile to which the pre-crash sensor 30 is applied. The front crash sensor 32 detects a front collision. The pre-crash sensor 30 is, for example, a millimeter-wave radar, or the like, that outputs a signal based on a distance to a front obstacle. The front crash sensor 32 is, for example, an acceleration sensor, or the like, that outputs a signal based on an acceleration of the vehicle.

Then, when the ECU 28 predicts a front collision of the vehicle on the basis of the signal from the pre-crash sensor 30, the ECU 28 initially activates the motor of each lap belt retractor 14 in the direction to retract the corresponding lap belt 12, and, after that, activates the motor of each shoulder belt retractor 22 in the direction to retract the corresponding shoulder belt 20.

Figure 3:
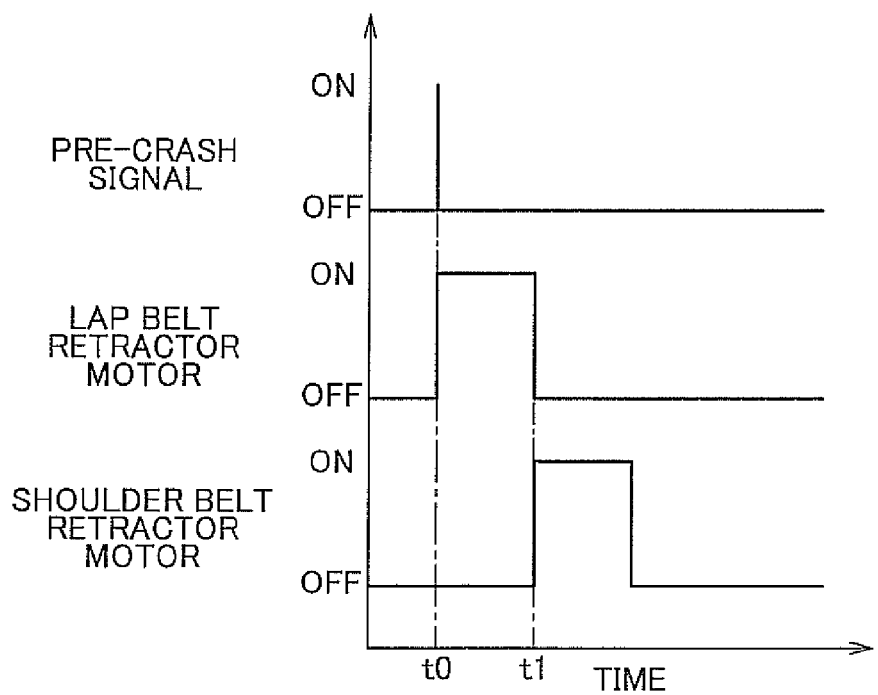
FIG. 3 is a timing chart that shows the operation timings of lap belt retractors and shoulder belt retractors that constitute the four-point seat belt system according to the first embodiment of the invention.

In the present embodiment, as shown in FIG. 3, as a front collision of the vehicle is predicted at time t0, each lap belt retractor 14 is activated and then, after activation of each lap belt retractor 14 is stopped (time t1), each shoulder belt retractor 22 is activated. Note that the time (time t1) when each lap belt retractor 14 is stopped may be not at the time when supply of electric current to each lap belt retractor 14 is interrupted as shown in FIG. 3 but, for example, at the time when an overload of the motor of each lap belt retractor 14 is detected (actually, when completion of retracting the lap belts 12 is detected), or the like.

In addition, when a front collision of the vehicle is detected by the front crash sensor 32, the ECU 28 activates the MGG of each lap belt retractor 14 and the MGG of each shoulder belt retractor 22. Furthermore, in the vehicle equipped with an airbag device (not shown) for protecting the occupant seated on the vehicle seat 11, the ECU 28 activates the airbag device when a front collision of the vehicle is detected by the front crash sensor 32.

Next, the operation of the first embodiment will be described.

In the above configured four-point seat belt system 10, as the occupant P seated on the vehicle seat 11 pulls out the shoulder belts 20 from the shoulder belt retractors 22 while engaging the tongue plate 18 with the buckle 16, the pair of left and right parallel shoulder belts 20 restrain the upper body of the occupant P seated on the vehicle seat 11, and the pair of left and right integrated (serial) lap belts 12 restrain the hip of the seated occupant P, as schematically shown in FIG. 1.

As the ECU 28 predicts a front collision of the vehicle on the basis of the signal from the pre-crash sensor 30, the ECU 28 initially activates the motor of each lap belt retractor 14 in the direction to retract each lap belt 12. Subsequently, the ECU 28 activates the motor of each shoulder belt retractor 22 in the direction to retract each shoulder belt 20. Thus, in the four-point seat belt system 10, the tension is applied to the left and right lap belts 12 and left and right shoulder belts 20 to eliminate a slack of the belts. In addition, the tension applied to the lap belts 12 as described above eliminates deformation (upward lift) due to the retracting force of the shoulder belt retractor 22 at each coupled portion 12A of the shoulder belt 20.

As the vehicle undergoes a front collision and then the front collision is detected by the front crash sensor 32, the ECU 28 activates the MGGs of the lap belt retractors 14 and shoulder belt retractors 22 to further forcibly retract the left and right lap belts 12 and left and right shoulder belts 20. By so doing, the occupant P seated on the vehicle seat 11 is restrained to the vehicle seat 11 by the four-point seat belt system 10, and is protected against the front collision of the vehicle. In addition, in the vehicle equipped with the airbag device, the occupant P seated on the vehicle seat 11 is protected by the airbag device as well.

Here, in the four-point seat belt system 10, when a front collision is predicted, the lap belt retractors 14 are activated before the shoulder belt retractors 22 are activated. This prevents or suppresses the lap belt retractors 14 from applying tension to the lap belts 12 against retracting forces of the shoulder belt retractors 22 transmitted to the lap belts 12 through the shoulder belts 20.

Particularly, in the present embodiment, the shoulder belt retractors 22 are activated after the lap belt retractors 14 complete retracting (applying tension to) the lap belts 12. Therefore, the lap belt retractors 14 are able to apply tension to the lap belts 12 without acting against the retracting forces of the shoulder belt retractors 22.

Then, in the four-point seat belt system 10, the shoulder belt retractors 22 are activated in a properly worn state where the tension is applied to the lap belts 12 as described above. Thus, forces retracting the shoulder belts 20 by the shoulder belt retractors 22 prevent or suppress deformation of each lap belt 12 at the coupled portion 12A at which the lap belt 12 is coupled to the shoulder belt 20. That is, the lap belts 12 and the shoulder belts 20 are properly worn in the stage of collision prediction. This contributes to improvement of occupant restraint performance through activation of the pretensioner mechanisms of the lap belt retractors 14 and shoulder belt retractors 22 thereafter.

In addition, in the four-point seat belt system 10, as described above, because the lap belt retractors 14 retract the lap belts 12 to which no retracting forces of the shoulder belt retractors 22 are applied, the lap belt retractors 14 are able to ensure readiness for tensioning (removing a slack of) the lap belts 12 for a short period of time while reducing the size and power of the motors.

Furthermore, in the four-point seat belt system 10, in the configuration that the pair of left and right shoulder belts 20 restrain the upper body of the occupant P seated on the vehicle seat 11 substantially in a bilaterally symmetrical manner, the left and right lap belt retractors 14 substantially equally retract the left and right coupled lap belts 12 from left and right sides (both sides in the vehicle width direction). This suppresses a positional deviation between the left and right shoulder belts 20, and the lap belts 12 and the shoulder belts 20 are further properly worn.

Note that the first embodiment describes an example in which the ECU 28 activates the lap belt retractors 14 and the shoulder belt retractors 22 as shown in the timing chart in FIG. 3; however, the aspect of the invention is not limited to this embodiment. Instead, for example, it is also applicable that the lap belt retractors 14 and the shoulder belt retractors 22 are activated as shown in the timing chart in FIG. 4.

Figure 4:
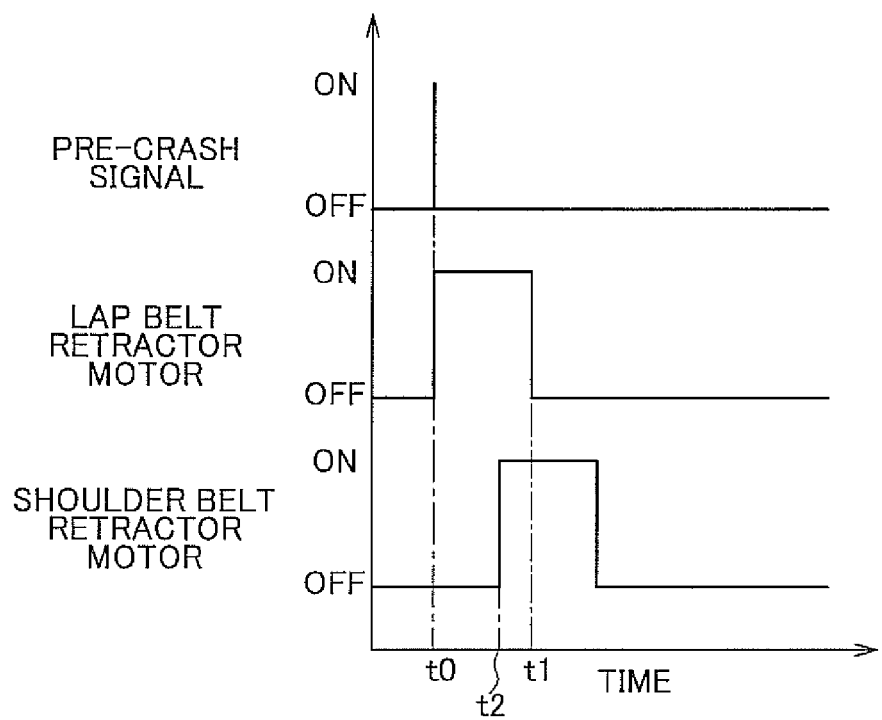
FIG. 4 is a timing chart that shows an alternative example of the operation timings of the lap belt retractors and shoulder belt retractors that constitute the four-point seat belt system according to the first embodiment of the invention.

In the control according to an alternative example shown in FIG. 4, the ECU 28 starts activating the shoulder belt retractors 22 at time t2 (t0<t2<t1) that comes after the lap belt retractors 14 have been activated (time t0) and before the lap belt retractors 14 complete the operations (at time t1). In this configuration as well, an amount (period of time) by which the lap belt retractors 14 retract the lap belts 12 while receiving the retracting forces of the shoulder belt retractors 22 is smaller than that of the configuration that, for example, the lap belt retractors 14 and the shoulder belt retractors 22 are activated substantially at the same time. This suppresses deformation of the lap belts by the retracting forces of the shoulder belts. That is, the lap belts 12 and the shoulder belts 20 are properly worn. In addition, this contributes to reduction in size and power of the motors of the lap belt retractors 14.

In addition, in this alternative example, a period of time from when the motors of the lap belt retractors 14 are started to when the motors of the shoulder belt retractors 22 are stopped, that is, a period of time during which a slack of the lap belts 12 and shoulder belts 20 is eliminated in order to be ready for a collision, is shortened. Note that the timing of completion of operation of the lap belt retractors 14 is not limited to a timing before completion of operation of the shoulder belt retractors 22 as shown in FIG. 4; however, completing operation of the lap belt retractors 14 during times when the tension of each shoulder belt 20 is small (loose) further contributes to reduction in size and power of the motors of the lap belt retractors 14. Thus, it is desirable that the lap belt retractors 14 complete operation before the shoulder belt retractors 22 complete operation.

Figure 5:
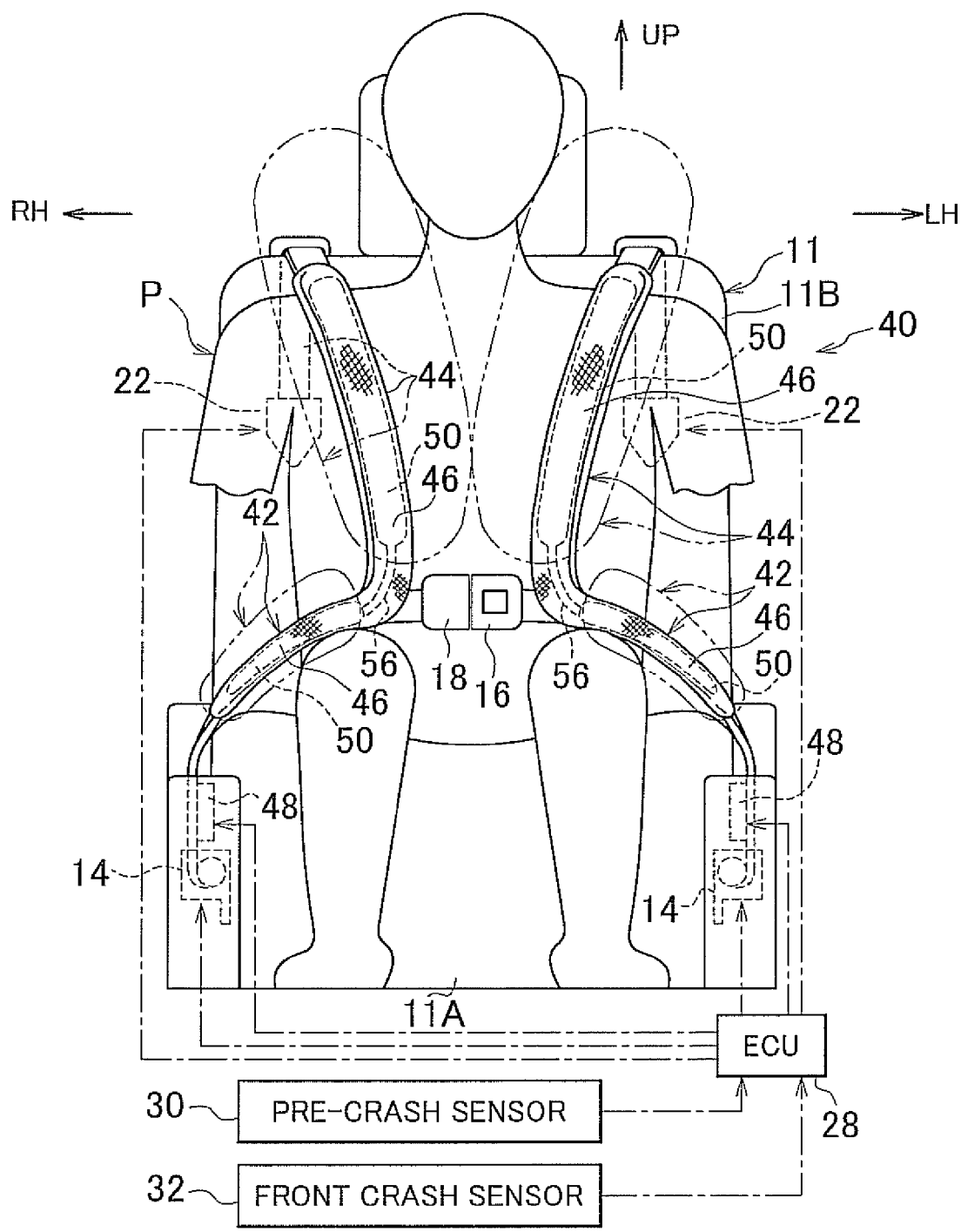
FIG. 5 is a front view that shows a four-point air belt system according to a second embodiment of the invention.

FIG. 5 shows a schematic front view of a four-point air belt system 40, which is a vehicle occupant restraint system according to a second embodiment of the invention. As shown in the drawing, the four-point air belt system 40 differs from the four-point seat belt system 10 according to the first embodiment in that lap belts 42 and shoulder belts 44 are provided instead of the lap belts 12 and the shoulder belts 20 and portions of the lap belts 42 and shoulder belts 44 in the longitudinal direction thereof have inflatable portions 46.

Figure 6:
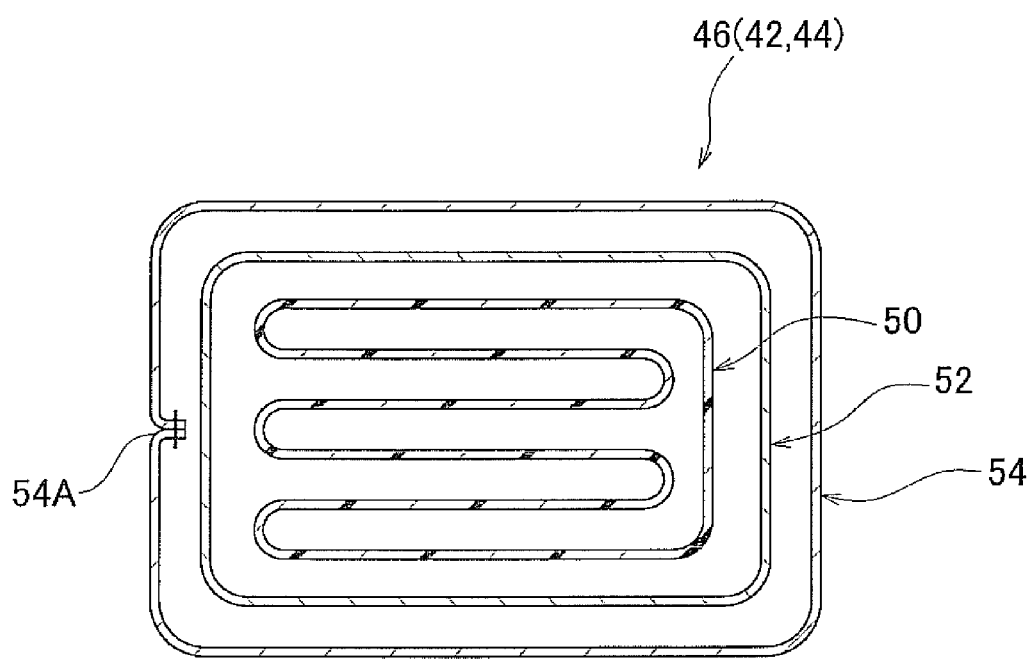
FIG. 6 is a schematic cross-sectional view, taken perpendicularly to the longitudinal direction, of an inflatable portion that constitutes the four-point air belt system according to the second embodiment of the invention.

As shown in FIG. 6, each inflatable portion 46 includes an airbag 50, a mesh webbing 52 and a cover 54 as major components. The airbag 50 inflates and deploys into a predetermined shape (see the imaginary line shown in FIG. 5) with gas supplied from an inflator 48. The mesh webbing 52 is formed as an extensible bag so as to cover the airbag 50. The cover 54 breaks at a tear portion 54A as the mesh webbing 52 accommodated therein inflates as the airbag 50 inflates. Each inflatable portion 46 is connected to portions of the lap belt 42 and shoulder belt 44, other than the inflatable portion 46, (portions formed of non-inflatable belt-like webbings) by the mesh webbing 52.

In the present embodiment, the airbag 50 of the inflatable portion 46 of the lap belt 42 and the airbag 50 of the inflatable portion 46 of the shoulder belt 44, located on the same side as the above lap belt 42, are in fluid communication with each other through a communication passage 56 (see FIG. 5). Each communication passage 56 is, for example, formed of a non-inflatable portion or a flexible tube formed integrally between the airbags 50 on the same side.

Then, the four-point air belt system 40 is configured so that, as the ECU 28 activates the inflators 48, the inflatable portions 46 of the left and right lap belts 42 and shoulder belts 44 are inflated and deployed into a predetermined shape as indicated by the imaginary line in FIG. 5. Inflation and deployment of the inflatable portions 46 apply tension to the left and right lap belts 42 and shoulder belts 44 in the longitudinal direction. Thus, in the four-point air belt system 40, pretensioner effect is obtained through inflation and deployment of the inflatable portions 46, and the lap belt retractors 14 and the shoulder belt retractors 22 have no such pretensioner mechanisms that forcibly retract the left and right lap belts 42 and shoulder belts 44 by MGGs.

That is, the ECU 28 that constitutes the four-point air belt system 40 differs from the ECU 28 that constitutes the four-point seat belt system 10 in that, when a front collision is detected by the front crash sensor 32, the ECU 28 that constitutes the four-point air belt system 40 activates the inflators 48 instead of activating the MGGs of the lap belt retractors 14 and shoulder belt retractors 22. In addition, the other configuration of the four-point air belt system 40 is similar to the corresponding configuration of the four-point seat belt system 10 including portions not shown in the drawing.

Thus, the four-point air belt system 40 according to the second embodiment basically can obtain a similar advantageous effect to that of the four-point seat belt system 10 in regard to the configuration that the left and right lap belts 42 and shoulder belts 44 are properly worn at the time when a front collision is predicted. In addition, the four-point air belt system 40 is able to effectively restrain the seated occupant P to the vehicle seat 11 by the left and right lap belts 42 and shoulder belts 44 while protecting the occupant P. In the vehicle equipped with the four-point air belt system 40, it is possible to eliminate the necessity of the airbag device for the occupant P seated on the vehicle seat 11.

Note that the second embodiment describes an example in which each inflatable portion 46 is provided for each of the lap belt 42 and the shoulder belt 44; however, the aspect of the invention is not limited to this embodiment. For example, it is also applicable that each inflatable portion 46 is provided only for any one of the lap belt 42 and the shoulder belt 44.

In addition, the second embodiment also describes an example in which the motors of the lap belt retractors 14 are initially activated when a front collision is predicted (an unavoidable front collision is predicted); however, the aspect of the invention is not limited to this embodiment. For example, it is also applicable that supply of gas to the inflatable portions 46 (inflation and deployment of the inflatable portions 46) of the left and right lap belts 42 are initially started when a front collision is predicted. By so doing, it is possible to eliminate the necessity of the motors of the lap belt retractors 14. Note that the configuration for initially activating the inflatable portions 46 of the lap belts 42 when a front collision is predicted may utilize a mechanical configuration, such as a configuration that the inflatable portions 46 of the lap belts 42 are arranged adjacent to the inflators 48 with respect to the inflatable portions 46 of the shoulder belts 44 as shown in FIG. 5, a configuration that an open-close valve provided for the communication passage 56 is controlled by the ECU 28, or a configuration that exclusive inflators are provided respectively for the inflatable portions of the shoulder belts 44 and the lap belts 42 and then the sequence of activating these inflators is controlled by the ECU 28.

Furthermore, the above embodiments describe an example in which the shoulder belt retractors 22 are motor retractors that are able to retract shoulder belts 20 by the power of the motors; however, the aspect of the invention is not limited to this configuration. For example, it is also applicable that the shoulder belt retractors 22 have no motors. In this configuration, when a collision is predicted, the lap belt retractors 14 are initially activated, and, after that (including the case after a collision is detected), for example, the pretensioner devices (MGGs) of the shoulder belt retractors 22 may be activated together with the pretensioner devices of the lap belt retractors 14, or, for example, the pretensioner devices (MGGs) of the lap belt retractors 14 and the pretensioner devices (MGGs) of the shoulder belt retractors 22 may be activated in the stated order.

Figure 7:
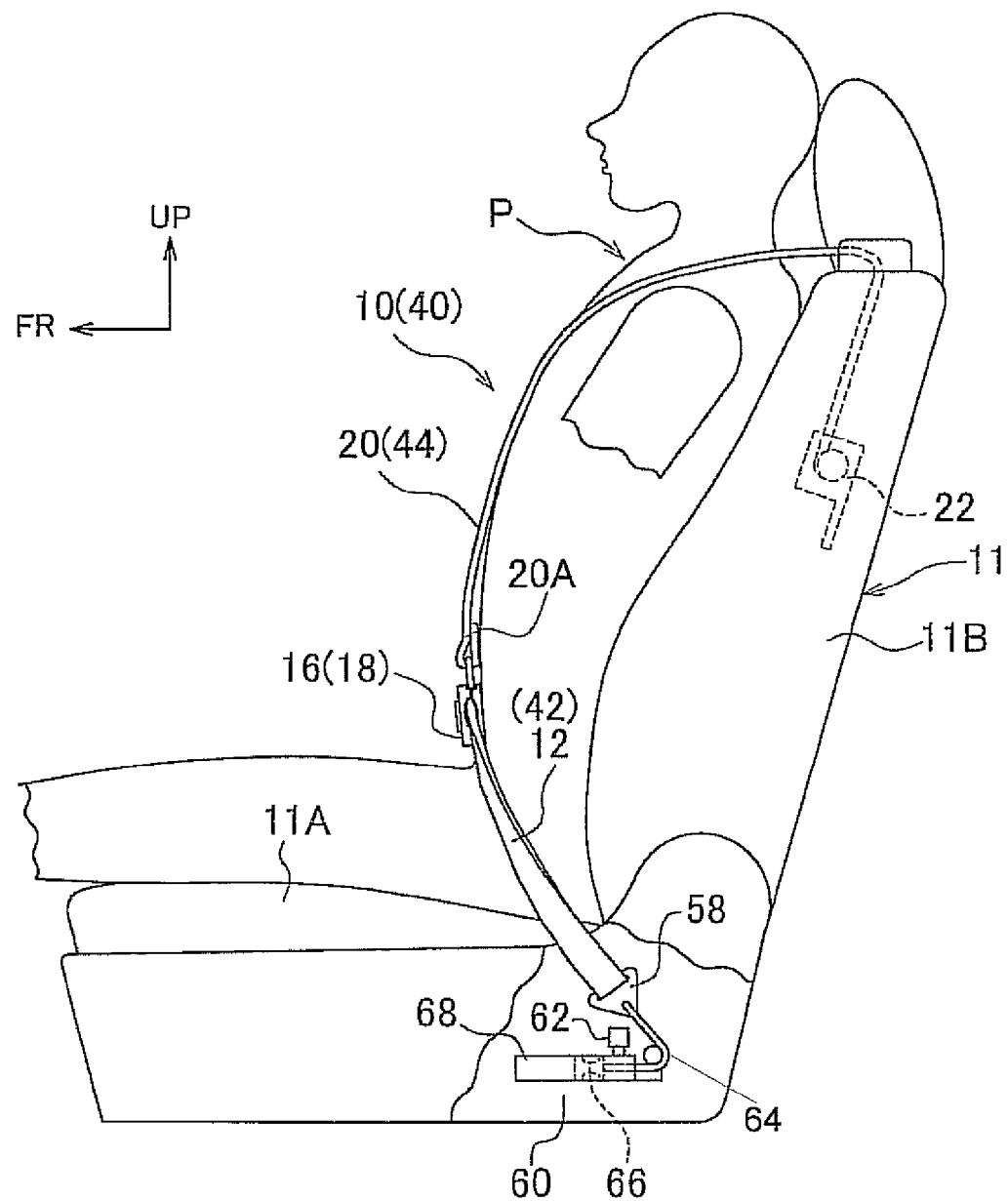
FIG. 7 is a side view that shows an alternative example of the four-point seat belt system according to the embodiments of the invention.

In addition, furthermore, the above embodiments describe an example in which the tension is applied to the left and right lap belts 12 or left and right lap belts 42 prior to start of application of tension to the shoulder belts 20 or the shoulder belts 44 by the driving force of the motors of the lap belt retractors 14 or the inflation and deployment of the inflatable portions 46 provided for the lap belts 42 when a collision is predicted; however, the aspect of the invention is not limited to these configurations. For example, an alternative example shown in FIG. 7 is also applicable. Specifically, FIG. 7 shows an example in which lap pretensioners 60 are provided instead of the lap belt retractors 14, and each of the lap pretensioners 60 supports an anchor member 58 fixed to an outer end of the lap belt 12 (or the lap belt 42, the same applies to the following description) in the seat width direction. As the MGG 62 is activated, each lap pretensioner 60 moves a piston 66 forward in a cylinder 68 to apply tension to the lap belt 12. One end of a wire 64 is coupled to the anchor member 58, and the piston 66 is fixed to the other end of the wire 64. In this way, a tensioner according to the aspect of the invention is not limited to the retractor (the motor or the pretensioner mechanism provided for the retractor) or the inflatable portion, such as the air belt.

In addition, the above embodiments describe an example in which the tension is applied to the left and right lap belts 12 or the left and right lap belts 42 prior to start of application of tension to the shoulder belts 20 or the shoulder belts 44 when a collision is predicted; however, the aspect of the invention is not limited to these configurations. For example, it is also applicable that the tension is applied to the left and right lap belts 12 or the left and right lap belts 42 prior to start of application of tension to the shoulder belts 20 or the shoulder belts 44 when a collision is detected.

Furthermore, the above embodiments describe an example in which the left and right lap belts 12 or the left and right lap belts 42 are arranged in series with each other to constitute a "lap belt" according to the aspect of the invention that restrains the hip of the seated occupant P; however, the aspect of the invention is not limited to this configuration. For example, it is also applicable that one end of a single lap belt is supported on the vehicle seat 11 or the vehicle body via an anchor or a retractor, the tongue plate 18 is provided at the other end of the single lap belt, and then the tongue plate 18 is coupled to the buckle 16 provided for the vehicle seat 11 or the vehicle body to thereby restrain the hip of the seated occupant P. In this configuration, a pair of left and right shoulder belts 20 or a single shoulder belt 20, of which the lower end portion 20A is coupled to a substantially middle portion of the lap belt in the seat width direction, may be provided.

Furthermore, the first embodiment describes an example in which the pair of left and right lap belt retractors 14 retract the serially coupled left and right lap belts 12 from both left and right sides; however, the aspect of the invention is not limited to this configuration. For example, it is also applicable that, when a front collision of the vehicle is predicted, the lap belts 12 are retracted by (the motor of) a single lap belt retractor 14. In this case, it is applicable that only one of the motors of the two lap belt retractors 14 is activated (including the case where only one of the lap belt retractors 14 includes a motor) or it is applicable that a common lap belt retractor 14 that retracts the left and right lap belts 12 is provided.

What is claimed is:

1. A vehicle occupant restraint system comprising:
    a lap belt that restrains a hip of a seated occupant;
    a shoulder belt that has a lower end portion coupled to a middle portion of the lap belt in a seat width direction and that is used to restrain an upper body of the seated occupant;
    a lap belt retractor that applies tension to and forcibly retracts the lap belt;
    a shoulder belt retractor that applies tension to and forcibly retracts the shoulder belt; and
    a controller that, when a vehicle collision is predicted or detected, activates the lap belt retractor before activating the shoulder belt retractor.

2. The vehicle occupant restraint system according to claim 1, wherein the controller activates the shoulder belt retractor after the lap belt retractor completes applying a tension to and forcibly retracting the lap belt.

3. The vehicle occupant restraint system according to claim 1, wherein the controller activates the shoulder belt retractor before the lap belt retractor completes forcibly retracting the lap belt.

4. The vehicle occupant restraint system according to claim 1, wherein
    a pair of the shoulder belts are provided so that the pair of the left and right shoulder belts arranged in parallel with each other in the seat width direction restrain the upper body of the occupant,
    the shoulder belt retractor is provided so as to apply tension to and forcibly retract each of the pair of left and right shoulder belts, and
    the lap belt retractor is provided so as to apply tension to and forcibly retract the lap belt from both ends of the lap belt in a longitudinal direction of the lap belt.

5. The vehicle occupant restraint system according to claim 4, wherein
    the shoulder belt retractor is provided with each of the pair of left and right shoulder belts, and
    the lap belt retractor is provided at each end of the lap belt in the longitudinal direction of the lap belt.

* * * * *